US011187205B2

(12) United States Patent
Vaccari

(10) Patent No.: US 11,187,205 B2
(45) Date of Patent: Nov. 30, 2021

(54) RESONANCE WIND TURBINE

(71) Applicant: Graf S.p.A., Nonantola (IT)

(72) Inventor: Andrea Vaccari, Nonantola (IT)

(73) Assignee: Graf S.p A., Nonantola (IT)

( * ) Notice: Subject to any disclaimer, the term of this patent is extended or adjusted under 35 U.S.C. 154(b) by 0 days.

(21) Appl. No.: 16/762,143

(22) PCT Filed: Nov. 7, 2018

(86) PCT No.: PCT/IB2018/058736
§ 371 (c)(1),
(2) Date: May 7, 2020

(87) PCT Pub. No.: WO2019/092603
PCT Pub. Date: May 16, 2019

(65) Prior Publication Data
US 2020/0362815 A1 Nov. 19, 2020

(30) Foreign Application Priority Data

Nov. 7, 2017 (IT) .......................... 102017000126783

(51) Int. Cl.
*F03D 5/06* (2006.01)
*F03D 13/20* (2016.01)
*F03D 7/02* (2006.01)

(52) U.S. Cl.
CPC ............ *F03D 5/06* (2013.01); *F03D 7/0204* (2013.01); *F03D 13/22* (2016.05); *F05B 2240/85* (2020.08); *F05B 2270/321* (2013.01)

(58) Field of Classification Search
CPC .......... F03D 5/06; F03D 13/22; F03D 7/0204; F05B 2240/85; F05B 2270/321
See application file for complete search history.

(56) References Cited

U.S. PATENT DOCUMENTS

2007/0040389 A1* 2/2007 Kelley ...................... F03D 5/06
290/55
2014/0175800 A1* 6/2014 Thorp ........................ F03D 7/00
290/55
(Continued)

FOREIGN PATENT DOCUMENTS

WO   WO 2016/116657   7/2016
WO   WO 2019/092603   5/2019

OTHER PUBLICATIONS

International Search Report and the Written Opinion dated Feb. 12, 2019 From the International Searching Authority Re. Application No. PCT/IB2018/058736. (8 Pages).

*Primary Examiner* — Sean Gugger

(57) ABSTRACT

The resonance wind turbine (1) comprises:
a base assembly (10, 12, 18) for the fixing of the wind turbine (1) to a base surface (2), on the base assembly being located an oscillating element (3) provided with a proximal portion (4) associated with the base assembly (10, 12, 18) and a distal portion (5) opposed to the proximal portion (4) and adapted to oscillate, due to the effect of the incident wind blowing along a direction of propagation (A), in which the oscillation of the oscillating element (3) occurs along a main direction (B) substantially horizontal and perpendicular to the direction of propagation (A); and
an electro-magnetic induction assembly (6, 7) associated with at least one of the base assembly (10, 12, 18) and the oscillating element (3), comprising a magnetic element (6) and an electrical winding (7) arranged in the proximity of the magnetic element (6) and adapted to produce electrical energy by means of the relative motion of the magnetic element (6) and the electrical winding (7) along the main direction (B);
wherein the base assembly (10, 12, 18) comprises a fixed portion (10) adapted to rest on the base surface (2) and a (Continued)

moveable structure (11) associated with the fixed portion (10) by means of oscillation means (18) adapted to allow the resonance oscillation of the moveable structure (11) along the main direction (B) due to the effect of the oscillation of the oscillating element (3).

20 Claims, 4 Drawing Sheets

(56) References Cited

U.S. PATENT DOCUMENTS

2015/0330358 A1* 11/2015 Barrero Gil ............ F03B 13/00
  290/54
2016/0013737 A1  1/2016 Yanez Villarreal \* cited by examiner

RESONANCE WIND TURBINE

RELATED APPLICATIONS

This application is a National Phase of PCT Patent Application No. PCT/IB2018/058736 having International filing date of Nov. 7, 2018, which claims the benefit of priority of Italian Patent Application No. 102017000126783 filed on Nov. 7, 2017. The contents of the above applications are all incorporated by reference as if fully set forth herein in their entirety.

FIELD AND BACKGROUND OF THE INVENTION

The present invention relates to a resonance wind turbine.

The use of wind turbines is known, also referred to as wind generators, employed for the production of electrical energy by exploiting the action of the wind.

The most widespread wind turbines are turbines with horizontal axis of rotation relative to the ground, which are composed of a steel tower having heights of between 60 and 100 meters, on top of which a blade system is mounted which is made to rotate by action of the wind.

Such blades are keyed on a central pin (hub) which forces them to rotate around the axis of the pin itself, to which a series of devices are connected, such as brakes, multipliers, and the like, which transmit the motion to an electric generator.

The wind generator thus allows converting the kinetic energy of the blades made to rotate by the wind into electrical energy through the electric generator, thereby producing electrical current to be fed to the network.

Such wind turbines with horizontal axis of rotation allow for production of electrical energy only under certain wind direction and speed conditions, which means that a continuously production of electrical energy is not feasible.

In fact, conventional wind generators are stationary, wherein positioning of the blades according to the wind direction is not possible.

Furthermore, due to the height of the tower and the length of the blades, the wind generators of this type are extremely bulky, thus requiring very large land portions as well as a very specific geographic conformation clear of obstacles so as to enable wind propagation, such that optimal operation thereof is allowed. Just because of their considerable size, such wind turbines have a high impact from the landscape point of view, due to which installation thereof is not allowed in some territorial contexts.

Alternatively, these systems can be installed in open sea, on the so-called "off-shore systems", which allow to overcome the drawback linked to the characteristics of the territory, though entailing higher costs related to the maintenance of individual wind turbines due to the corrosive action of salt water.

One type of innovative wind turbine that has become widespread in recent years is the vibrating pole wind turbine, which is comprised of a pole being free of rotating blades and permanently associated with the ground, the height of which is smaller than conventional wind generators, which pole is associated with an electric generator.

In particular, these systems exploit the fact that the pole hit by the wind oscillates until it goes in resonance, that is, with the maximum possible oscillation amplitude.

The kinetic energy due to this oscillation is transformed into electrical energy by means of the electric generator which generates electrical current.

It deals with a system that is certainly less impacting from the point of view of the overall dimensions and much less invasive for the landscape.

However, the electric power generated depends on the amplitude of the pole oscillation, which is expected not to be excessive in order not to risk breakage of the pole itself, due to which the electric power generated is rather modest or in any case not sufficient to cover users' needs.

SUMMARY OF THE INVENTION

The main aim of the present invention is to devise a resonance wind turbine which allows exploiting the action of the wind in order to produce electrical energy.

Within the aim set forth above, one object of the present invention is to obtain a greater production volume of electrical energy than known wind turbines.

Another object of the present invention is to obtain a wind turbine which is capable of ensuring optimal operation regardless of the wind direction and intensity.

A further object of the present invention is to devise a resonance wind turbine which allows overcoming the aforementioned drawbacks of the prior art within the scope of a simple, rational, easy, efficient to use and cost-effective solution.

The aforementioned objects are achieved by the present resonance wind turbine according to claim 1.

BRIEF DESCRIPTION OF THE SEVERAL VIEWS OF THE DRAWINGS

Other characteristics and advantages of the present invention will become more evident from the description of a preferred, but not exclusive embodiment of a resonance wind turbine, illustrated by way of an indicative, but non-limiting example, in the attached drawings in which.

DESCRIPTION OF SPECIFIC EMBODIMENTS OF THE INVENTION

Figure 1:
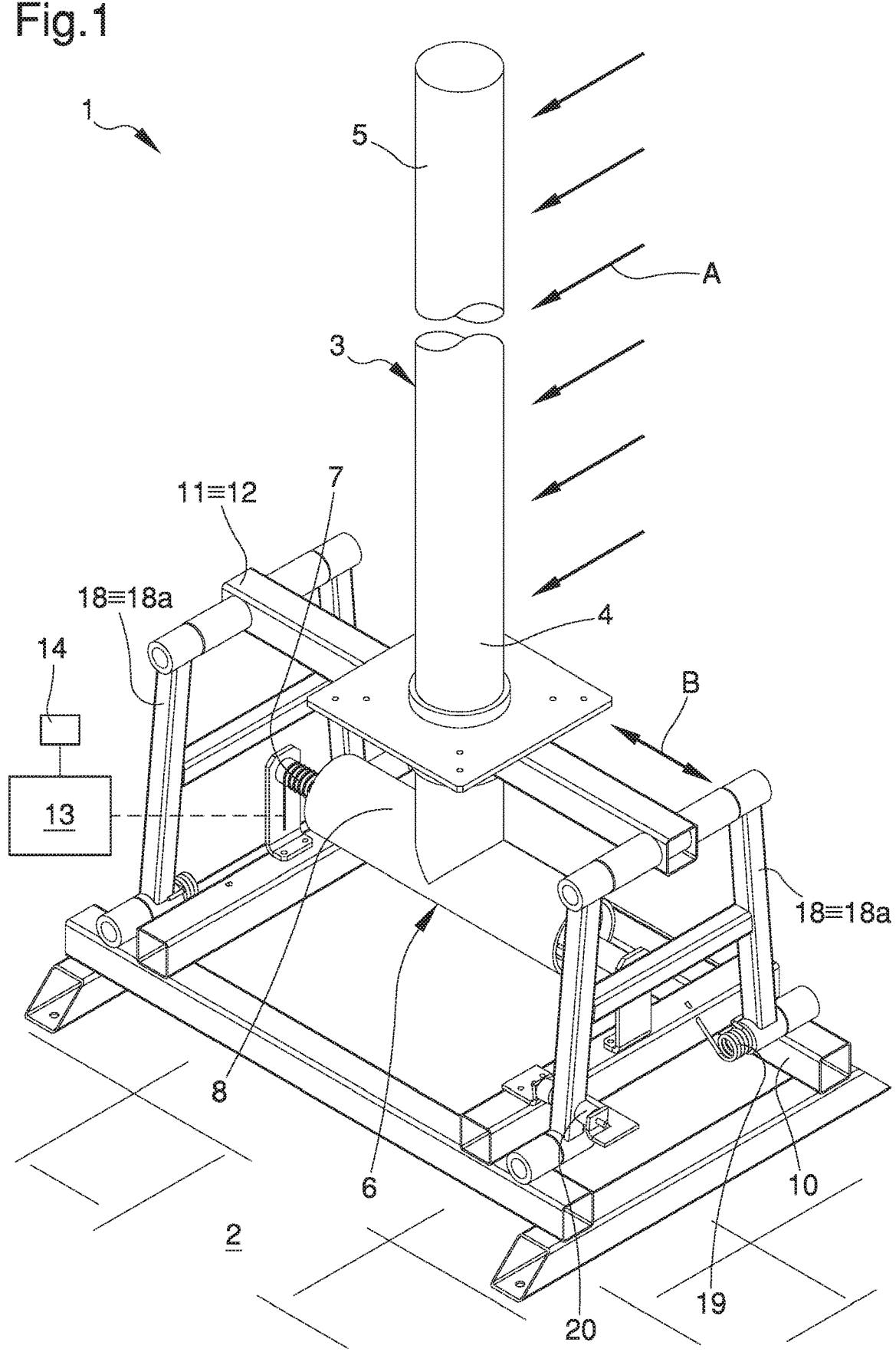
FIG. 1 is an axonometric view of the wind turbine according to the invention in a first embodiment.

With particular reference to these figures, reference numeral 1 globally indicates a resonance wind turbine.

The resonance wind turbine 1 comprises at least one base assembly 10, 12, 18 for the fixing of the wind turbine 1 to at least one base surface 2.

In this base assembly 10, 12, 18 is locatable at least one oscillating element 3 provided with at least one proximal portion 4 associated with the base assembly 10, 12, 18 and at least one distal portion 5 opposed to the proximal portion 4, in which this oscillating element 3 is adapted to oscillate, due to the effect of the incident wind blowing along at least one direction of propagation A.

As is known, a body urged by a recurring stress is able to oscillate with a certain frequency, which depends on the type of material, in particular the density and elasticity thereof.

In particular, the oscillation of the oscillating element 3 occurs along at least one main direction B substantially horizontal and perpendicular to the direction of propagation A.

It should be noticed that, in the present discussion, by "oscillation along the main direction B" is meant the forward and backward movement of the oscillating element 3 along a trajectory comparable to a rectilinear trajectory except for a slight rotation. In particular, the circumferential arc described by the distal portion 5, which is the portion at which the oscillation is greater, is reduced, so that for the sake of simplicity the trajectory is to be understood as rectilinear.

When a body is hit by the wind, it undergoes an aeroelastic phenomenon called "flutter", in which the body vibrates due to the effect of the fluid current.

From the fluid-dynamic point of view, when the wind hits the oscillating element 3, the fluid flow lines tend to bend in the proximity of the obstacle following the profile thereof.

Nevertheless, due to the viscous friction arising between the fluid, which in this case is air, and the oscillating element 3, a detachment of the confined flow occurs, i.e. the profile of the flow lines is interrupted and vortex formation occurs downstream of the oscillating element itself.

In particular, this phenomenon is accentuated the greater the wind speed.

The vortices that are formed tend to modify the distribution of pressures, such that they exert forces on the oscillating element 3, comprising a drag component, which acts along the direction of propagation A, and an orthogonal component, which acts along the main direction B.

This orthogonal component tends to push the oscillating element 3 along the main direction B, or orthogonally relative to the direction of propagation A of the wind.

In addition, considering that the flow lines tend to completely surround the oscillating element 3, vortices being counter-rotating to one another are formed which push this oscillating element 3 back and forth along the main direction B, which oscillating element, being fixed at the proximal portion 4, begins to oscillate.

Preferably the oscillating element 3 is a pole, although types of elements other than the oscillating element 3, such as a lamppost, a truss, a panel, a flag and the like, are not to be ruled out, which allows for remarkable use versatility of the wind turbine 1. Furthermore, the wind turbine 1 comprises at least one electro-magnetic induction assembly 6, 7 associated with at least one of the base assembly 10, 12, 18 and the oscillating element 3.

Such electro-magnetic induction assembly 6, 7 comprises at least one magnetic element 6 and at least one electrical winding 7 arranged in the proximity of the magnetic element itself and adapted to produce electrical energy by means of the relative motion of the magnetic element 6 and of the electrical winding 7 along the main direction B.

In particular, the relative motion between the electrical winding 7 and the magnetic element 6 causes a variation of the magnetic field flow over time, with generation of an induced electromotive force.

The electrical winding 7 is composed of a coil connected to an electrical circuit closed by an accumulator or a motor.

In contrast the magnetic element 6, as visible from the figures, is composed of a cylindrical support 8 internally of which a plurality of magnets 9 are housed having a substantially annular shape, internally of which the electrical winding 7 is housed and arranged in the proximity of the magnets 9.

The possibility of providing the magnetic element 6 with a different configuration cannot however be ruled out.

Consequently, due to the effect of the induced electromotive force, an induced electrical current is generated internally of this circuit, which electrical current can be stored in an accumulator or intended for the utility.

This way, the movement of the oscillating element 3 is exploited so as to set the electro-magnetic induction assembly 6, 7 in motion thereby generating electrical current.

According to the invention, the base assembly 10, 12, 18 comprises at least one fixed portion 10 adapted to rest on the base surface 2 and at least one moveable structure 11 associated with the fixed portion 10 by means of oscillation means 18 adapted to allow the resonance oscillation of the moveable structure 11 along the main direction B due to the effect of the oscillation of the oscillating element 3.

In other words, upon moving, the oscillating element 3 imparts a thrust to the moveable structure 11, which oscillates accordingly, thus going into resonance therewith.

Depending on the material it is made of and its conformation, each body is characterized by a "natural oscillation frequency" which represents the maximum oscillation which the body can undergo under elastic conditions, i.e. without occurrence of permanent deformations.

Accordingly, when the moveable structure 11 goes into resonance, it oscillates at a frequency equal to its natural oscillation frequency.

The frequency at which the moveable structure 11 oscillates depends on the oscillation frequency of the oscillating element 3, which is substantially equal to the frequency at which the vortices are formed downstream of the oscillating element itself.

In the event of the frequency at which the vortices are formed being equal to the natural oscillation frequency of the moveable structure 11, the latter goes into resonance and oscillates at the maximum possible amplitude.

Advantageously, the moveable structure 11 comprises at least one supporting portion 12 of the oscillating element 3, arranged on top of the fixed portion 10 and adapted to translate back and forth along the main direction B.

As shown in the figures, the supporting portion 12 is arranged substantially horizontally.

Taking into account that the oscillating element 3 is associated with the supporting portion 12, when the latter translates along the main direction B it translatingly drags the oscillating element itself, which then describes an oscillation of greater amplitude than the case in which it is fixed to a stationary support.

This way, it is possible to increase the distance run by the magnetic element 6 and the electrical winding 7, thereby increasing the electrical power generated.

Conveniently, at least one of the magnetic element 6 and the electrical winding 7 is associated with at least one of the moveable structure 11 and the distal portion 5 and the other of the magnetic element 6 and the electrical winding 7 is associated with the fixed portion 10, so as to exploit the movement of the parts of the wind turbine 1 due to the effect of the wind for the relative movement of the electro-magnetic induction assembly 6, 7.

In the configuration shown in the figures, the magnetic element 6 is associated with the moveable structure 11 and the electrical winding 7 is associated with the fixed portion 10.

This way, the electrical winding 7 is therefore kept stationary, which makes it possible to arrange the wires making up the circuit so as to avoid any encumbrance, while the magnetic element 6 is translating along the main direction B due to the effect of the oscillation of the moveable structure 11.

The possibility to associate the magnetic element 6 with the fixed portion 10 and the electrical winding 7 with the moveable structure 11 cannot however be ruled out.

In an alternative configuration not shown in the illustrations, the magnetic element 6 is associated with the distal portion 5 and the electrical winding 7 is associated with the fixed portion 10.

The distal portion 5 is the part which during oscillation covers the greater distance, which is increased due to the translation effect given by the supporting portion 12.

Thus, the stroke of the magnetic element 6 relative to the electrical winding 7 is greater, though conversely, mechanical stresses are increased.

Also in this case the possibility of associating the electrical winding 7 to the distal portion 5 and the magnetic element 6 to the fixed portion 10 cannot be ruled out.

The vortices formation frequency depends on the wind speed, so in the case where the wind has a moderate speed, the frequency at which vortices are formed is reduced, with the risk of not reaching the resonance conditions of the moveable structure 11.

As previously discussed, the natural oscillation frequency depends on the elasticity of the whole system, that is, on its Young's modulus.

In particular, the smaller the Young's modulus the greater the stiffness of the material, and the lower the natural oscillation frequency, so that the moveable structure 11 goes into resonance more easily.

Advantageously, the wind turbine 1 comprises at least one resistance control device 13 operatively connected to the electro-magnetic induction assembly 6, 7, which device is adapted to control the power consumption of the electro-magnetic induction assembly itself to guarantee the resonance oscillation of the moveable structure 11.

In other words, the resistance control device 13 allows varying the current generated by the electro-magnetic induction assembly 6, 7, so as to increase or decrease the counter-electromotive force existing between the electrical winding 7 and magnetic element 6.

This way, the relative movement of the magnetic element 6 and the electrical winding 7 may be more or less prevented by the counter-electromotive force, thereby causing the system to increase or decrease the rigidity thereof, which results in a variation in the natural oscillation frequency.

This adjustment can be carried out, e.g., according to the electric power generated by the wind turbine 1, so based on this value the resistance control device 13 operates on the withdrawn electrical current, so as to make the moveable structure 11 more or less rigid.

In particular, in the event of the generated electrical power being lower than a predetermined value, it may occur that the wind intensity is not sufficient to cause the moveable structure 11 to resonate.

In this case, the resistance control device 13 provides to increase the withdrawn electrical current, thereby increasing the counter-electromotive force and the rigidity of the moveable structure itself.

The resistance control device 13 can also be provided with at least a first sensor 14 for measuring the wind intensity.

In this case, the resistance control device 13 provides for the variation of the withdrawn current as a function of the wind intensity detected by the first sensor 14.

In particular, the higher the wind speed detected by the first sensor 14, the lower the electrical absorption assigned by the resistance control device 13, so the greater the elasticity of the system.

Conveniently, the wind turbine 1 comprises at least one rotating bedplate 15 for supporting the base assembly 10, 12, 18 which bedplate is adapted to rotate around at least one substantially vertical axis of rotation C to arrange the base assembly 10, 12, 18 so that the main direction B is always substantially perpendicular to the direction of propagation A of the wind.

The main direction B is the only direction along which the moveable structure 11 can oscillate and, in the case where the direction of propagation A of the wind is not perpendicular thereto, the oscillation of the oscillating element 3 tends to push the moveable structure 11 in a direction along which it is constrained, thus running the risk to cause the wind turbine 1 to be damaged.

In addition, it is possible that the direction along which moves the oscillating element 3 provides the moveable structure 11 with a thrust component along the main direction B. However, in this case, the distance run by the supporting portion 12 is not sufficient to ensure an adequate relative movement between the magnetic element 6 and the electrical winding 7, so that the generated electrical power is not sufficient for the utility's request.

Consequently, the use of a rotating bedplate 15 allows always operating under optimal conditions in terms of maximum electrical production output, also avoiding stresses which may cause the base assembly 10, 12, 18 to be damaged.

Conveniently, the wind turbine 1 comprises at least a second sensor 16 for detecting the direction of the wind and motor-driven means 17 which are operatively connected to the second sensor 16 and adapted to rotate the rotating bedplate 15 around the axis of rotation C depending on the direction of the wind detected by the second sensor itself.

The wind turbine 1 can also comprise at least one blade element 21 associated with the rotating bedplate 15 and lying on a plane substantially orthogonal to the main direction B.

The blade element 21 can be placed in a flag configuration, wherein the plane on which this blade element lies is substantially parallel to the direction of propagation A.

In this case, the rotating bedplate 15 is idle, so that it can rotate freely, being dragged by the blade element 21 which acts as a sail and tends to always position itself in the flag configuration, which is particularly useful in the event of variation in the direction of propagation A.

The possibility of providing only one of the motor-driven means 17 associated with the second sensor 16 and the blade element 21 cannot however be ruled out.

Furthermore, the possibility of manufacturing the wind turbine 1 not provided with a rotating bedplate 15 cannot be ruled out.

Figure 2:
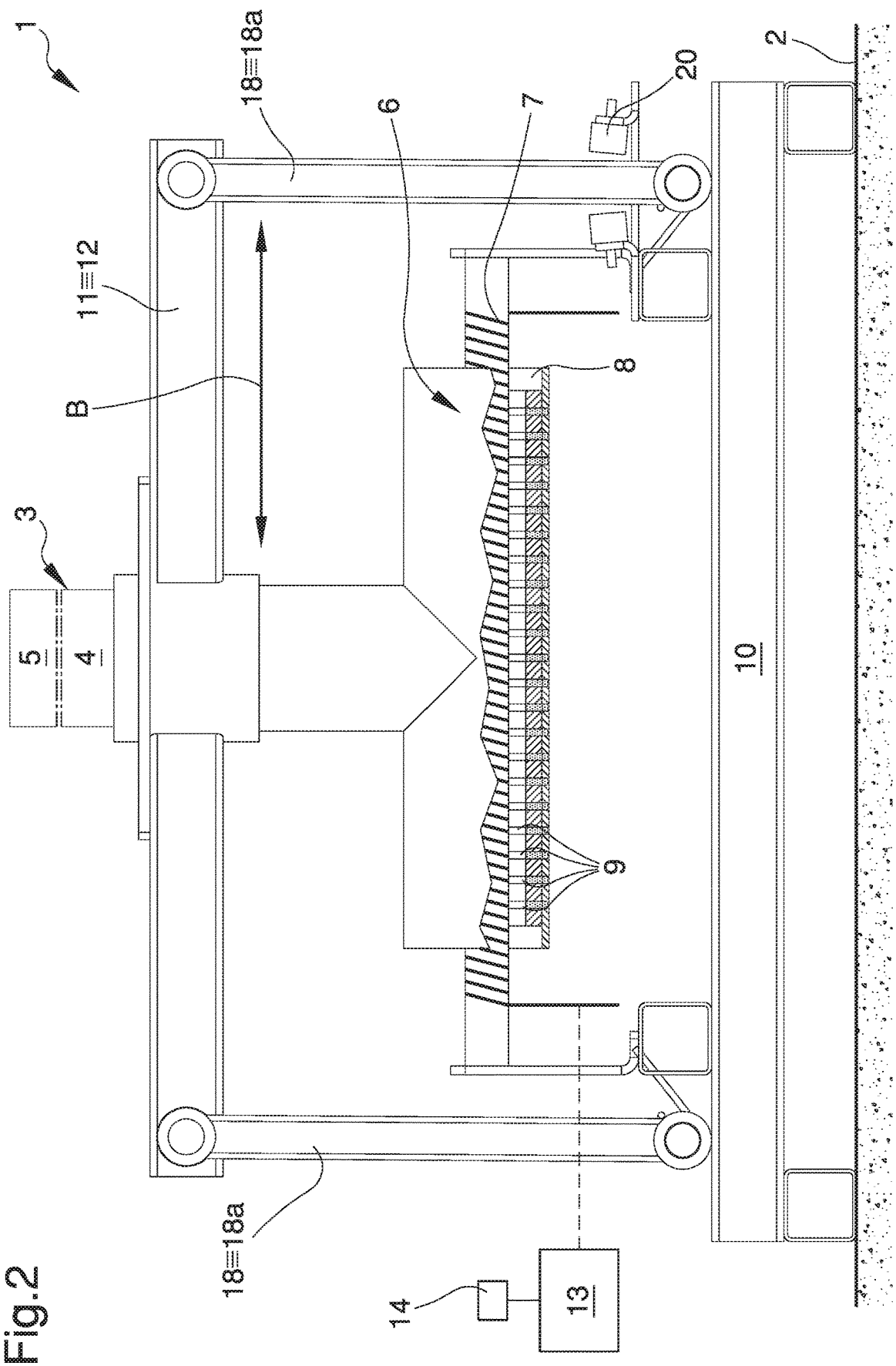
FIG. 2 is a partially cutaway front view of the wind turbine of FIG. 1.
Figure 3:
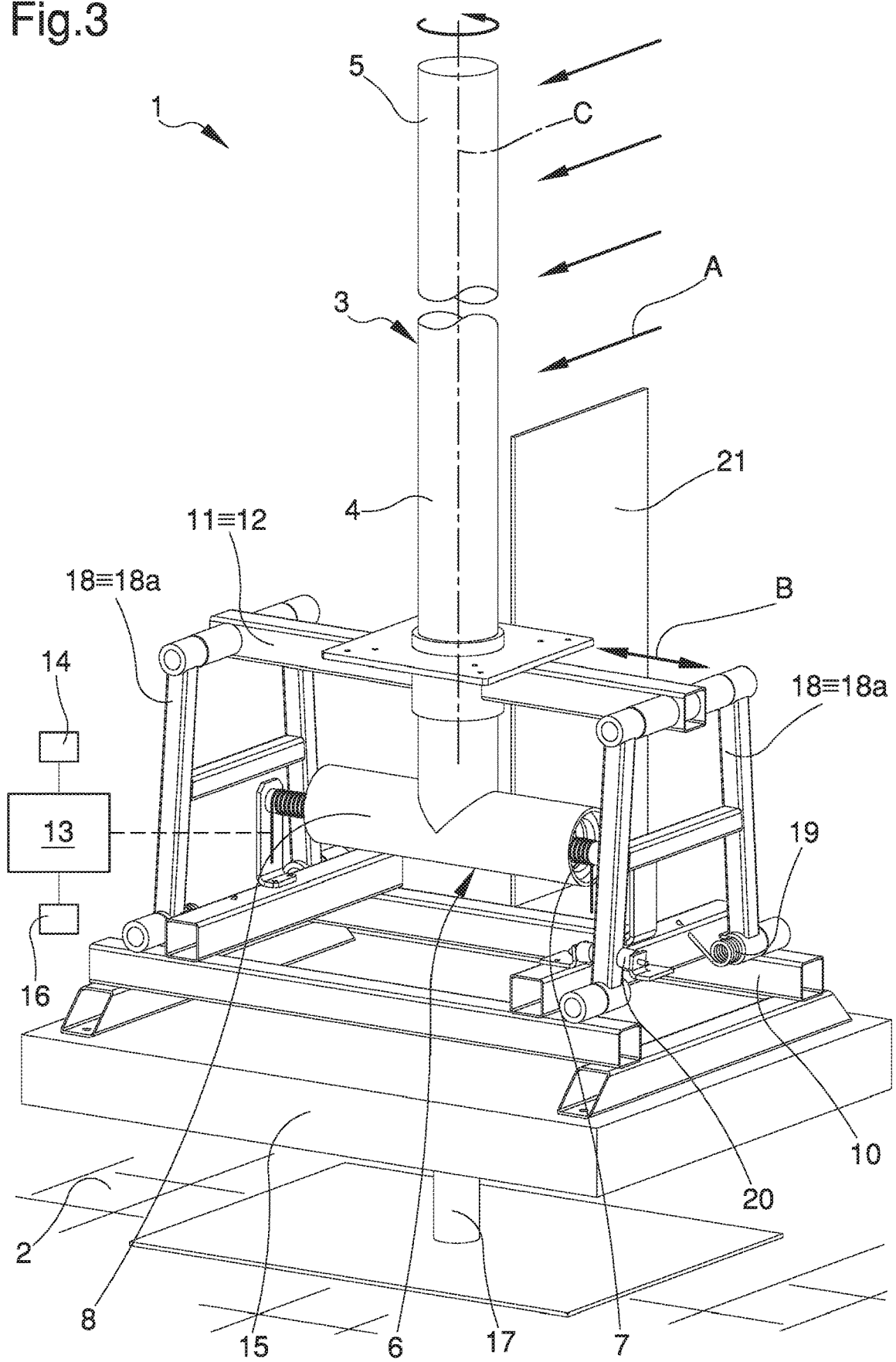
FIG. 3 is an axonometric view of an alternative configuration of the wind turbine in the first embodiment.

In the first embodiment shown in the FIGS. 1 to 3, the oscillation means 18 comprise at least two connecting elements 18a hinged to the moveable structure 11 and to the fixed portion 10 to define an articulated quadrilateral structure.

It should be noticed that by articulated quadrilateral is meant a structure consisting of four rigid members connected two by two by means of hinges, so that the members can be moved relative to each other.

In particular, the connecting elements 18a have a length substantially equal to each other to define an articulated parallelogram structure, so that, during oscillation of the moveable structure 11, the supporting portion 12 undergoes simple translation, without rotating on itself.

Furthermore, the oscillation means 18 comprise elastic means 19 adapted to bring the base assembly 10, 12, 18 back to a balance configuration wherein the connecting elements 18a are arranged substantially vertically.

In actual fact, the base assembly 10, 12, 18 is in a balanced configuration only in the absence of wind; consequently, during operation, the base assembly 10, 12, 18 is in the balanced position only instantaneously in the oscillation.

Conveniently, the action of the elastic means 19 provides an important contribution in terms of elasticity of the moveable structure 11, which affects the capacity of the whole system to oscillate in resonance.

In the solution shown in the figures, the elastic means 19 are springs interposed between the connecting elements 18a and the fixed portion 10, although the same may be arranged differently.

The base assembly 10, 12, 18 also comprises stop means 20 associated with the fixed portion 10 and adapted to prevent the oscillation of the moveable structure 11 beyond a predetermined amplitude, so as to prevent excessive stresses of the moveable structure itself and of the oscillation means 18, which could be damaged.

Figure 4:
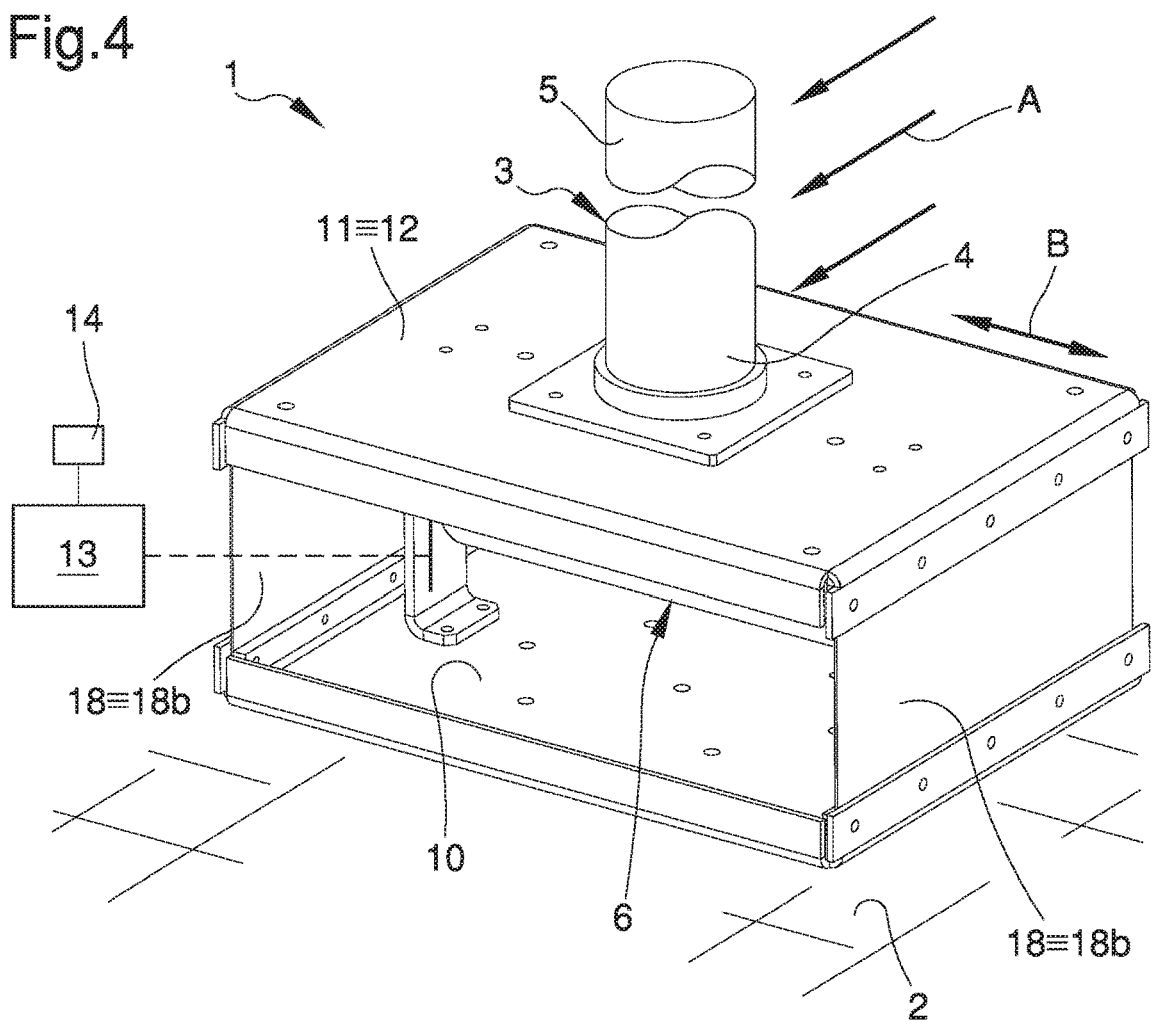
FIG. 4 is an axonometric view of the wind turbine according to the invention in a second embodiment.
Figure 5:
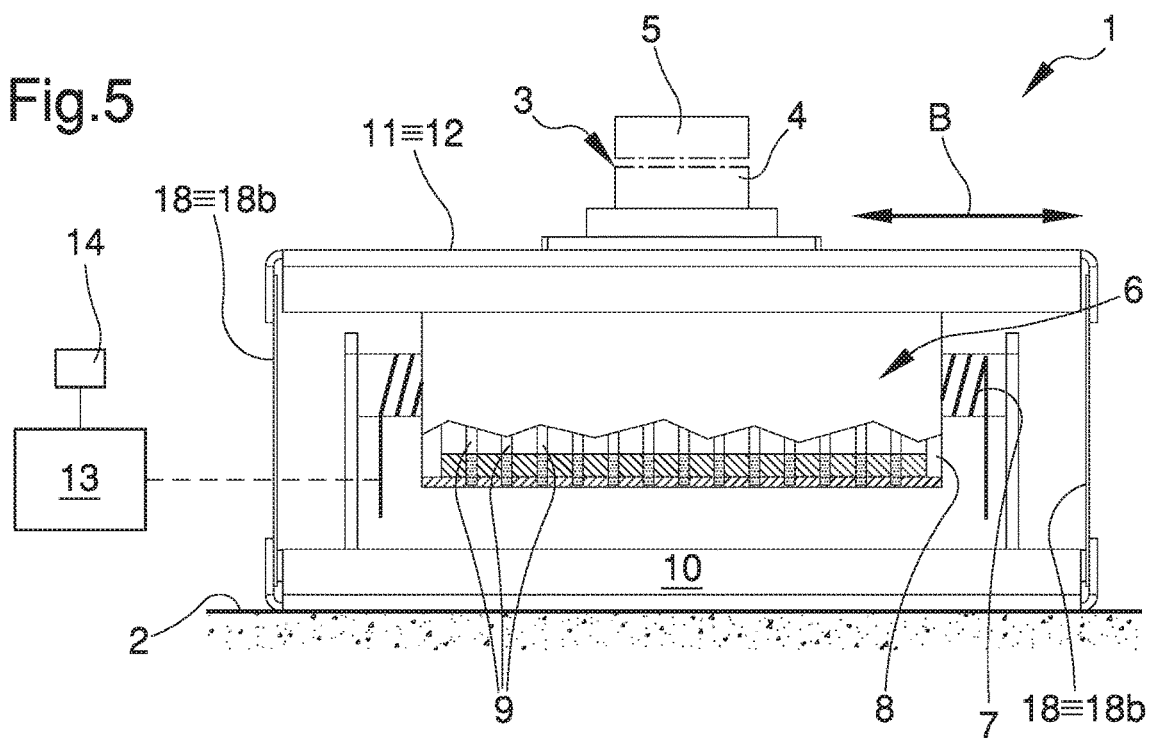
FIG. 5 is a partially cutaway front view of the wind turbine of FIG. 4.

In the second embodiment shown in the FIGS. 4 and 5, the oscillation means 18 comprise at least one sheet-shaped element 18b interposed between the fixed portion 10 and the supporting portion 12 and arranged substantially perpendicular to the main direction B.

Conveniently, the sheet-shaped element 18b is flexible to allow the oscillation of the moveable structure 11 along the main direction B.

Preferably, the sheet-shaped element 18b is made up of harmonic steel, that is silicon steel with a high carbon content, which undergoes hardening, so as to become extremely elastic.

Consequently, the flexibility of the sheet-shaped element 18b allows obtaining a rather wide oscillation, with consequent translation of the supporting portion 12 along the main direction B.

Advantageously, the moveable structure 11 comprises at least two sheet-shaped elements 18b arranged side by side at a predetermined distance, so that the supporting portion 12 undergoes only one translation along the main direction B, without rotating on itself.

Similarly to what has been discussed for the first embodiment, the elasticity of the sheet-shaped elements 18b is essential for the movement of the moveable structure 11, in particular for the ability to resonate.

The use, for example, of very rigid sheet-shaped elements 18b enables to obtain resonance conditions even under conditions of poor ventilation, but with a limited oscillation stroke.

Based on this embodiment there is no need of providing elastic means or stop means since the sheet-shaped elements 18b, being made of harmonic steel, are elastic and tend to return in vertical position during the oscillation, allowing the moveable structure 11 to oscillate in a resonant manner.

As a result, a base assembly 10, 12, 18 is obtained which is very simple from the constructive point of view, requiring less maintenance than other structures.

It has in practice been ascertained that the described invention achieves the intended objects.

In this regard it is emphasized that the particular expedient of providing a resonance wind turbine allows for the production of electrical energy by exploiting the action of the wind.

In addition, the particular expedient of providing the base assembly comprising a moveable structure oscillating in a resonant manner allows obtaining a production of electrical energy which is considerably greater than that obtained by means of the wind turbine of a known type.

In addition, the particular expedient of providing a rotating bedplate according to the direction of the wind allows ensuring correct and optimal operation of the wind turbine regardless of the direction of the wind.

Furthermore, the particular expedient of providing a resistance control device allows modifying the rigidity of the system, so as to ensure that the moveable structure goes into resonance regardless of the intensity of the wind.

Furthermore, the particular expedient of providing the base assembly whereon an oscillating element of various types can be arranged, such as a pole, a road sign, a lamppost, a panel, etc., allows obtaining a wind turbine which is extremely versatile from the point of view of location and use.

What is claimed is:

1. A resonance wind turbine (1) comprising:
at least one base assembly (10, 12, 18) for fixing of said wind turbine (1) to at least one base surface (2),
at least one oscillating element (3) mounted on said base assembly and provided with at least one proximal portion (4) associated with said base assembly (10, 12, 18) and at least one distal portion (5) opposed to said proximal portion (4) and adapted to oscillate, due to the effect of incident wind blowing along at least one direction of propagation (A), in which the oscillation of said oscillating element (3) occurs along at least one main direction (B) substantially horizontal and perpendicular to said direction of propagation (A); and
at least one electro-magnetic induction assembly (6, 7) associated with at least one of said base assembly (10, 12, 18) and said oscillating element (3), comprising at least one magnetic element (6) and at least one electrical winding (7) arranged in the proximity of said magnetic element (6) and adapted to produce electrical energy by means of the relative motion of said magnetic element (6) and said electrical winding (7) along said main direction (B);
wherein said base assembly (10, 12, 18) comprises at least one fixed portion (10) adapted to rest on said base surface (2) and at least one moveable structure (11) associated with said fixed portion (10) by means of oscillation means (18) adapted to allow the resonance oscillation of said moveable structure (11) along said main direction (B) due to the effect of the oscillation of said oscillating element (3);
wherein said oscillation means (18) comprises at least two connecting elements (18a) hinged to said moveable structure (11) and to said fixed portion (10) to define an articulated quadrilateral structure.

2. The resonance wind turbine (1) according to claim 1, wherein at least one of said magnetic element (6) and said electrical winding (7) is associated with at least one of said moveable structure (11) and said distal portion (5) and the other of said magnetic element (6) and said electrical winding (7) is associated with said fixed portion (10).

3. The resonance wind turbine (1) according to claim 2, wherein said magnetic element (6) is associated with said moveable structure (11) and said electrical winding (7) is associated with said fixed portion (10).

4. The resonance wind turbine (1) according to claim 2, wherein said magnetic element (6) is associated with said distal portion (5) and said electrical winding (7) is associated with said fixed portion (10).

5. The resonance wind turbine (1) according to claim 1, wherein said wind turbine (1) comprises at least one resistance control device (13) operatively connected to said electro-magnetic induction assembly (6, 7), adapted to control the power consumption of said electro-magnetic induction assembly (6, 7) to guarantee the resonance oscillation of said moveable structure (11).

6. The resonance wind turbine (1) according to claim 1, wherein said wind turbine (1) comprises at least one rotating bedplate (15) for supporting said base assembly (10, 12, 18) adapted to rotate around at least one substantially vertical axis of rotation (C) to arrange said base assembly (10, 12, 18) so that said main direction (B) is always substantially perpendicular to said direction of propagation (A) of the wind.

7. The resonance wind turbine (1) according to claim 6, wherein said wind turbine (1) comprises at least a sensor (16) for detecting the direction of the wind and motorization means adapted to rotate said rotating bedplate (15) depending on the direction of the wind detected by said sensor (16).

8. The resonance wind turbine (1) according to claim 6, wherein said wind turbine (1) comprises at least one blade element (21) associated with said rotating bedplate (15) and lying on a plane substantially orthogonal to said main direction (B).

9. The resonance wind turbine (1) according to claim 1, wherein said connecting elements (18a) have a length substantially equal to each other to define an articulated parallelogram structure.

10. The resonance wind turbine (1) according to claim 1, wherein said oscillation means (18) comprise elastic means (19) adapted to bring said base assembly (10, 12, 18) back to a balance configuration in which said connecting elements (18a) are arranged substantially vertically.

11. The resonance wind turbine (1) according to claim 1, wherein said base assembly (10, 12, 18) comprises stop means (20) associated with said fixed portion (10) and adapted to prevent the oscillation of said moveable structure (11) beyond a predetermined width.

12. A resonance wind turbine (1) comprising:
at least one base assembly (10, 12, 18) for fixing of said wind turbine (1) to at least one base surface (2),
at least one oscillating element (3) mounted on said base assembly and provided with at least one proximal portion (4) associated with said base assembly (10, 12, 18) and at least one distal portion (5) opposed to said proximal portion (4) and adapted to oscillate, due to the effect of incident wind blowing along at least one direction of propagation (A), in which the oscillation of said oscillating element (3) occurs along at least one main direction (B) substantially horizontal and perpendicular to said direction of propagation (A); and
at least one electro-magnetic induction assembly (6, 7) associated with at least one of said base assembly (10, 12, 18) and said oscillating element (3), comprising at least one magnetic element (6) and at least one electrical winding (7) arranged in the proximity of said magnetic element (6) and adapted to produce electrical energy by means of the relative motion of said magnetic element (6) and said electrical winding (7) along said main direction (B);
wherein said base assembly (10, 12, 18) comprises at least one fixed portion (10) adapted to rest on said base surface (2) and at least one moveable structure (11) associated with said fixed portion (10) by means of oscillation means (18) adapted to allow the resonance oscillation of said moveable structure (11) along said main direction (B) due to the effect of the oscillation of said oscillating element (3);
wherein said moveable structure (11) comprises at least one supporting portion (12) of said oscillating element (3), arranged on top of said fixed portion (10) and adapted to translate back and forth along said main direction (B);
wherein said oscillation means (18) comprise at least one sheet-shaped element (18b) interposed between said fixed portion (10) and said supporting portion (12) and arranged substantially perpendicular to said main direction (B), said sheet-shaped element (18b) being flexible to allow the oscillation of said moveable structure (11) along said main direction (B).

13. The resonance wind turbine (1) according to claim 12, wherein said moveable structure (11) comprises at least two of said sheet-shaped elements (18b) arranged side by side at a predetermined distance.

14. The resonance wind turbine (1) according to claim 12, wherein at least one of said magnetic element (6) and said electrical winding (7) is associated with at least one of said moveable structure (11) and said distal portion (5) and the other of said magnetic element (6) and said electrical winding (7) is associated with said fixed portion (10).

15. The resonance wind turbine (1) according to claim 14, wherein said magnetic element (6) is associated with said moveable structure (11) and said electrical winding (7) is associated with said fixed portion (10).

16. The resonance wind turbine (1) according to claim 14, wherein said magnetic element (6) is associated with said distal portion (5) and said electrical winding (7) is associated with said fixed portion (10).

17. The resonance wind turbine (1) according to claim 1, wherein said wind turbine (1) comprises at least one resistance control device (13) operatively connected to said electro-magnetic induction assembly (6, 7), adapted to control the power consumption of said electro-magnetic induction assembly (6, 7) to guarantee the resonance oscillation of said moveable structure (11).

18. The resonance wind turbine (1) according to claim 1, wherein said wind turbine (1) comprises at least one rotating bedplate (15) for supporting said base assembly (10, 12, 18) adapted to rotate around at least one substantially vertical axis of rotation (C) to arrange said base assembly (10, 12, 18) so that said main direction (B) is always substantially perpendicular to said direction of propagation (A) of the wind.

19. The resonance wind turbine (1) according to claim 18, wherein said wind turbine (1) comprises at least a sensor (16) for detecting the direction of the wind and motorization means adapted to rotate said rotating bedplate (15) depending on the direction of the wind detected by said sensor (16).

20. The resonance wind turbine (1) according to claim 18, wherein said wind turbine (1) comprises at least one blade element (21) associated with said rotating bedplate (15) and lying on a plane substantially orthogonal to said main direction (B).

* * * * *